(12) United States Patent
Lai

(10) Patent No.: US 10,915,896 B2
(45) Date of Patent: Feb. 9, 2021

(54) SIGNATURE VERIFICATION METHOD, APPARATUS, AND SYSTEM

(71) Applicant: Tencent Technology (Shenzhen) Company Limited, Guangdong (CN)

(72) Inventor: Zhonghua Lai, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1018 days.

(21) Appl. No.: 15/185,868

(22) Filed: Jun. 17, 2016

(65) Prior Publication Data

US 2016/0292678 A1 Oct. 6, 2016

Related U.S. Application Data

(63) Continuation of application No. PCT/CN2014/095981, filed on Dec. 31, 2014.

(30) Foreign Application Priority Data

Jan. 2, 2014 (CN) .......................... 2014 1 0003628

(51) Int. Cl.
*G06Q 20/38* (2012.01)
*H04L 9/32* (2006.01)
(Continued)

(52) U.S. Cl.
CPC ..... *G06Q 20/3829* (2013.01); *G06Q 20/0855* (2013.01); *G06Q 20/38215* (2013.01);
(Continued)

(58) Field of Classification Search
None
See application file for complete search history.

(56) References Cited

U.S. PATENT DOCUMENTS 5,915,023 A * 6/1999 Bernstein ............... G06Q 20/04
705/35
7,054,845 B2 5/2006 Oshima et al.
(Continued)

FOREIGN PATENT DOCUMENTS

CN 101685512 A 3/2010
CN 102609841 7/2012
(Continued)

OTHER PUBLICATIONS

Xiao, Hannan, et al.; A Purchase Protocol with Multichannel Authentication. 2009, UHRA. https://patents.google.com/scholar/15758465175013072648?q=third+party+server+in+payment+authentication&q=signature+verification&q=encryption&q=receive+first+key,receive+second+key&patents=false&scholar (Year: 2009).*
(Continued)

*Primary Examiner* — El Mehdi Oussir
(74) *Attorney, Agent, or Firm* — Anova Law Group, PLLC

(57) ABSTRACT

Described are a signature verification method, apparatus, and system. The method includes: encrypting a third-party payment identifier and payment information according to a first key to obtain a first signature; encrypting a third-party client identifier and first signature information according to a second key to obtain a second signature; and providing the third-party client identifier, the first signature information, and the second signature to a client server for verification.

14 Claims, 8 Drawing Sheets

(51) Int. Cl.
  *G06Q 20/08* (2012.01)
  *G06Q 20/40* (2012.01)
(52) U.S. Cl.
  CPC .......... *G06Q 20/405* (2013.01); *H04L 9/321* (2013.01); *H04L 9/3247* (2013.01); *H04L 9/3297* (2013.01); *H04L 2209/56* (2013.01)

(56) References Cited

U.S. PATENT DOCUMENTS

| | | | |
|---|---|---|---|
| 7,266,698 B2* | 9/2007 | Matsumoto | G06F 21/645 705/67 |
| 7,333,958 B2 | 2/2008 | Oshima et al. | |
| 2001/0042051 A1* | 11/2001 | Barrett | G06Q 20/367 705/65 |
| 2003/0233334 A1* | 12/2003 | Smith | G06Q 20/367 705/75 |
| 2004/0078332 A1* | 4/2004 | Ferguson | G06Q 20/105 705/41 |
| 2006/0179319 A1 | 8/2006 | Krawczyk | |
| 2008/0189186 A1 | 8/2008 | Choi et al. | |
| 2009/0217047 A1* | 8/2009 | Akashika | H04L 63/06 713/175 |
| 2010/0180124 A1* | 7/2010 | Morijiri | H04L 9/3231 713/176 |
| 2011/0087872 A1* | 4/2011 | Shah | G06F 21/554 713/2 |
| 2013/0124421 A1 | 5/2013 | Deng | |
| 2013/0152180 A1* | 6/2013 | Nair | H04L 63/0823 726/6 |
| 2013/0311382 A1* | 11/2013 | Fosmark | G06Q 20/425 705/71 |
| 2015/0019443 A1* | 1/2015 | Sheets | G06Q 20/322 705/71 |
| 2015/0121066 A1* | 4/2015 | Nix | H04L 9/0861 713/155 |
| 2015/0178724 A1* | 6/2015 | Ngo | G06Q 20/322 705/71 |
| 2016/0094525 A1* | 3/2016 | Lin | H04L 63/0853 713/171 |
| 2016/0196553 A1* | 7/2016 | Barhydt | G06Q 20/3829 705/71 |
| 2016/0253663 A1* | 9/2016 | Clark | G06Q 20/3274 705/75 |
| 2016/0284020 A1* | 9/2016 | Williams | G06Q 20/14 |
| 2017/0070484 A1* | 3/2017 | Kruse | H04L 9/30 |
| 2018/0062858 A1* | 3/2018 | Xu | H04L 9/3252 |

FOREIGN PATENT DOCUMENTS

| | | |
|---|---|---|
| CN | 102930429 | 2/2013 |
| CN | 103078742 A | 5/2013 |
| CN | 103095662 | 5/2013 |
| JP | H10-207962 A | 8/1998 |
| JP | 2001-243387 A | 9/2001 |
| JP | 2007-164589 A | 6/2007 |
| JP | 2009-526411 A | 7/2009 |
| JP | 2009-526455 A | 7/2009 |
| JP | 2010-218440 A | 9/2010 |
| JP | 2011-192297 A | 9/2011 |
| WO | WO2007067350 | 6/2007 |
| WO | WO 2007/090774 A1 | 8/2007 |
| WO | WO-2014107977 A1 * | 7/2014 ........... H04L 9/0825 |

OTHER PUBLICATIONS

Office Action dated Aug. 31, 2017 for Chinese Application No. 201410003628.7, 10 pages.
Office Action dated Sep. 5, 2017 for Japanese Application No. 2016-543226, 6 pages.
Tanaka, Toshiaki et al., "Current Topics on PKI Technologies for Mobile Commerce," IPSJ SIG Technical Report, vol. 2003, No. 74, Japan, Information Processing Society of Japan, 2003, 9 pages.
International Search Report and Written Opinion received in PCT Application No. PCT/CN2014/095981 dated Apr. 3, 2015 (3 pages).

* cited by examiner

SIGNATURE VERIFICATION METHOD, APPARATUS, AND SYSTEM

CROSS-REFERENCE TO RELATED APPLICATIONS

This application is a continuation of International Application No. PCT/CN2014/095981, filed on Dec. 31, 2014, which claims the priority to Chinese Patent Application No. 2014100036287 and filed on Jan. 2, 2014, which is incorporated herein by reference in its entirety.

FIELD OF THE TECHNOLOGY

The present disclosure relates to the field of Internet technologies, and in particular, to a signature verification method, apparatus, and system.

BACKGROUND

With rapid development of Internet technologies, online payment has become one great trend. Online payment involves transmission of payment information; therefore, how to ensure transmission security of payment information becomes an important issue, and a manner of performing signature verification on the payment information is a valid means to ensure transmission security of the payment information.

To avoid losses of a user or a third-party merchant caused by tempering of payment information in a transmission process, the payment information and a merchant account are usually signed, where signature is a manner of encrypting transmitted payment information and a merchant account. Using the payment information being order information as an example, in an existing order information transmission process, a payment service party such as a bank or a payment platform may provide a key corresponding to a third-party merchant to the third-party merchant in advance; after generating order information, the third-party merchant generates a signature for the order information and the merchant account according to the corresponding key; the third-party merchant transmits the order information, and the signature for the merchant account and the order information to a server of the payment service party; the server queries a key corresponding to the third-party merchant according to the merchant account, verities the key for the order information by using the queried key, and responds to the order information when the verification succeeds. That is, the server responds to the order information when verifying by using the signature that the order information and the merchant account are not tampered with.

In a process of implementing the present method, both the third-party merchant and the payment service party have the key of the third-party merchant used in the foregoing transmission process; therefore, once the key is leaked, other people can tamper with or forge order information and a merchant account by using the key, which easily causes property damages to the user or the third-party merchant, and has low security.

SUMMARY

To solve a problem in the background that both a third-party merchant and a payment service party have a key of the third-party merchant used in a payment information transmission process, and once the key is leaked, other people can tamper with or forge order information by using the key, which easily causes property losses to a user or the third-party merchant and has low security, embodiments of the present invention provide a signature verification method, apparatus, and system.

An aspect provides a signature verification method, where the method is used in a third-party server, and the method includes:

encrypting a third-party payment identifier and payment information according to a first key to obtain a first signature, where the first key is a key corresponding to the third-party payment identifier in a payment server, and the third-party payment identifier is a unique identifier of a third party in the payment server;

encrypting a third-party client identifier and first signature information according to a second key to obtain a second signature, where the first signature information includes the third-party payment identifier, the payment information, and the first signature, the second key is a key corresponding to the third-party client identifier in a client server, and the third-party client identifier is a unique identifier of the third party in the client server; and providing the third-party client identifier, the first signature information, and the second signature to the client server for verification, so that when the client server succeeds in verifying the second signature according to the second key, the third-party client identifier, and the first signature information, the client server sends the first signature information to the payment server for verification.

Another aspect provides a signature verification method, where the method is used in a client server, and the method includes:

acquiring a third-party client identifier, first signature information, and a second signature that are provided by a third-party server, where the third-party client identifier is a unique identifier of a third party in the client server, the first signature information includes a third-party payment identifier, payment information, and a first signature, and the second signature is obtained by the third-party server by encrypting the third-party client identifier and the first signature information according to a second key;

querying the second key corresponding to the third-party client identifier;

verifying the second signature according to the second key, the third-party client identifier, and the first signature information; and when the verification succeeds, sending the first signature information to a payment server for verification, where the third-party payment identifier is a unique identifier of the third party in the payment server, the first signature is obtained by the third-party server by encrypting the third-party payment identifier and the payment information according to a first key, and the first key is a key corresponding to the third-party payment identifier in the payment server.

Yet another aspect provides a signature verification method, where the method is used in a payment server, and the method includes:

receiving first signature information sent by a client server, where the first signature information includes a third-party payment identifier, payment information, and a first signature, the third-party payment identifier is a unique identifier of a third party in the payment server, and the first signature is obtained by a third-party server by encrypting the third-party payment identifier and the payment information according to a first key;

querying the first key corresponding to the third-party payment identifier;

verifying the first signature according to the first key, the third-party payment identifier, and the payment information; and when the verification succeeds, responding to the payment information, where the first signature information is sent by the client server after the client server succeeds in verifying a second signature according to a second key, a third-party client identifier, and the first signature information, where the second signature is obtained by the third-party server by encrypting the third-party client identifier and the first signature information according to the second key, the second key is a key corresponding to the third-party client identifier in the client server, and the third-party client identifier is a unique identifier of the third party in the client server.

Another aspect provides a signature verification apparatus, where the apparatus is used in a third-party server, and the apparatus includes:

a first signature module, configured to encrypt a third-party payment identifier and payment information according to a first key to obtain a first signature, where the first key is a key corresponding to the third-party payment identifier in a payment server, and the third-party payment identifier is a unique identifier of a third party in the payment server;

a second signature module, configured to encrypt a third-party client identifier and first signature information according to a second key to obtain a second signature, where the first signature information includes the third-party payment identifier, the payment information, and the first signature, the second key is a key corresponding to the third-party client identifier in a client server, and the third-party client identifier is a unique identifier of the third party in the client server; and a first providing module, configured to provide the third-party client identifier, the first signature information, and the second signature to the client server for verification, so that when the client server succeeds in verifying the second signature according to the second key, the third-party client identifier, and the first signature information, the client server sends the first signature information to the payment server for verification.

Another aspect provides a signature verification apparatus, where the apparatus is used in a client server, and the apparatus includes:

a first receiving module, configured to acquire a third-party client identifier, first signature information, and a second signature that are provided by a third-party server, where the third-party client identifier is a unique identifier of a third party in the client server, the first signature information includes a third-party payment identifier, payment information, and a first signature, and the second signature is obtained by the third-party server by encrypting the third-party client identifier and the first signature information according to a second key;

a first querying module, configured to query the second key corresponding to the third-party client identifier;

a first verification module, configured to verify the second signature according to the second key, the third-party client identifier, and the first signature information; and a second sending module, configured to: when the verification succeeds, send the first signature information to a payment server for verification, where the third-party payment identifier is a unique identifier of the third party in the payment server, the first signature is obtained by the third-party server by encrypting the third-party payment identifier and the payment information according to a first key, and the first key is a key corresponding to the third-party payment identifier in the payment server.

Another aspect provides a signature verification apparatus, where the apparatus is used in a payment server, and the apparatus includes:

a second receiving module, configured to receive first signature information sent by a client server, where the first signature information includes a third-party payment identifier, payment information, and a first signature, the third-party payment identifier is a unique identifier of a third party in the payment server, and the first signature is obtained by a third-party server by encrypting the third-party payment identifier and the payment information according to a first key;

a second querying module, configured to query the first key corresponding to the third-party payment identifier;

a second verification module, configured to verify the first signature according to the first key, the third-party payment identifier, and the payment information; and an information responding module, configured to: when the verification succeeds, respond to the payment information, where the first signature information is sent by the client server after the client server succeeds in verifying a second signature according to a second key, a third-party client identifier, and the first signature information, where the second signature is obtained by the third-party server by encrypting the third-party client identifier and the first signature information according to the second key, the second key is a key corresponding to the third-party client identifier in the client server, and the third-party client identifier is a unique identifier of the third party in the client server.

A seventh aspect provides a signature verification system, including a third-party server, a client server, and a payment server, where the third-party server includes the signature verification apparatus described in the fourth aspect;

the client server includes the signature verification apparatus described in the fifth aspect; and the payment server includes the signature verification apparatus described in the sixth aspect.

Beneficial effects of the technical solutions provided in the embodiments of the present invention are as follows:

A third-party payment identifier and payment information are encrypted according to a first key to obtain a first signature; a third-party client identifier and first signature information are encrypted according to a second key to obtain a second signature; and the third-party client identifier, the first signature information, and the second signature are provided to a client server for verification, thereby solving a problem that both a third-party merchant and a payment service party have a key of the third-party merchant used in the foregoing transmission process, and once the key is leaked, other people can tamper with or forge order information by using the key, which easily causes property losses to a user or the third-party merchant and has low security, and achieving an effect of improving verification accuracy and improving security of payment information by verifying two signatures, where a third-party merchant keeps two keys and the client server and a payment server keep one key separately.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following descriptions show merely some embodiments of the present invention, and a person of ordinary skill in the art may still derive other drawings from the accompanying drawings without creative efforts.

DESCRIPTION OF EMBODIMENTS

In order to make the objectives, technical solutions, and advantages of the present invention clearer, the embodiments of the present invention are described in detail in the following with reference to the accompanying drawings.

Different from a mechanism in the background that a third-party server only has one key, and only signs payment information once, in a process of implementing embodiments of the present invention, the inventor provides a mechanism that a third-party server has two keys, one key is provided by a client server, and the other key is provided by a payment server, so as to perform double signature on the payment information.

Figures 1, 2:
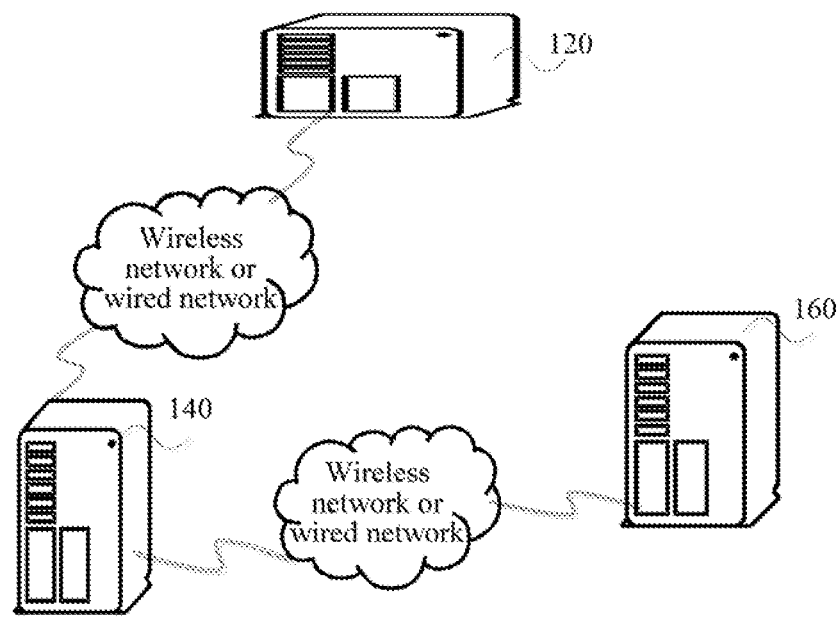
FIG. 1 is an exemplary schematic structural diagram of an implementation environment involved in signature verification methods according to embodiments of the present invention.
FIG. 2 is a flowchart of a signature verification method according to an embodiment of the present invention.

FIG. 1 is an exemplary schematic structural diagram of an implementation environment involved in signature verification methods according to embodiments of the present invention. The implementation environment includes a third-party server 120, a client server 140, and a payment server 160.

The third-party server 120 is configured to construct and provide payment information, and form double signatures, where the third-party server may be one server, or a server cluster formed by a plurality of servers, or a cloud computing service center. The third-party server 120 is connected to the client server 140 through a wireless network or a wired network. The third-party server 120 itself does not have a payment capability, and the third-party server 120 needs to invoke the client server 140 to perform payment. A third party refers to a merchant providing goods, where the goods may be expressions, game equipment, membership services, toys, clothes, and the like.

The client server 140 may be one server, or a server cluster formed by a plurality of servers, or a cloud computing center. The client server 140 is configured to receive invoking of the third-party server to complete payment for the third party, and verify, in the payment process, an outer first-layer signature of the payment information provided by the third-party server. The client server 140 is connected to the payment server 160 through a wireless network, and data transmission can be performed between the client server and the payment server. The client server 140 may be a server providing a background service to a social application client, or may be a server providing a background service to an instant messaging client, which is not limited.

The payment server 160 may be one server, or a server cluster formed by a plurality of servers, or a cloud computing center. The payment server 160 is configured to: after the client server 140 succeeds in verifying the outer signature of the payment information, continue to verify an inner signature of the payment information. After the signature verification succeeds, the payment server 160 may make a further response according to the payment information, such as ordering and transferring.

The embodiments of the present invention mainly involves three parts, namely, in the first part, a third-party server generates an inner first signature and an outer second signature for payment information; in the second part, a client server verifies the outer second signature; and in the third part, after the client server succeeds in verifying the outer second signature, a payment server verifies the inner first signature. The following first describes the double signature mechanism by using three embodiments, that is, a signature verification method at a third-party server side, an outer signature verification method at a client server method, and an inner signature verification method at a payment server side, and then provides an embodiment combining the third-party server side, the client server side, and the payment server side for further description. The details are as follows:

FIG. 2 is a flowchart of a signature verification method according to an embodiment of the present invention. This embodiment gives descriptions by using an example in which the signature verification method is applied in a third-party server shown in FIG. 1. The signature verification method includes:

Step 202: Encrypt a third-party payment identifier and payment information according to a first key to obtain a first signature.

The first key is a key corresponding to the third-party payment identifier in a payment server, and the third-party payment identifier is a unique identifier of a third party in the payment server.

Step 204: Encrypt a third-party client identifier and first signature information according to a second key to obtain a second signature.

The first signature information includes the third-party payment identifier, the payment information, and the first signature, the second key is a key corresponding to the third-party client identifier in the client server, and the third-party client identifier is a unique identifier of the third party in the client server.

Step 206: Provide the third-party client identifier, the first signature information, and the second signature to the client server for verification.

The client server is configured to: when the client server succeeds in verifying the second signature according to the second key, the third-party client identifier, and the first signature information, send the first signature information to the payment server for verification.

In conclusion, in the signature verification method provided in this embodiment, a third-party payment identifier and payment information are encrypted according to a first key to obtain a first signature; a third-party client identifier and first signature information are encrypted according to a second key to obtain a second signature; and the third-party client identifier, the first signature information, and the second signature are provided to a client server for verification, thereby solving a problem that both a third-party merchant and a payment service party have a key of the third-party merchant used in the foregoing transmission process, and once the key is leaked, other people can tamper with or forge order information by using the key, which easily causes property losses to a user or the third-party merchant and has low security, and achieving an effect of improving verification accuracy and improving security of payment information by verifying two signatures, where a third-party merchant keeps two keys and the client server and a payment server keep one key separately.

Figure 3:
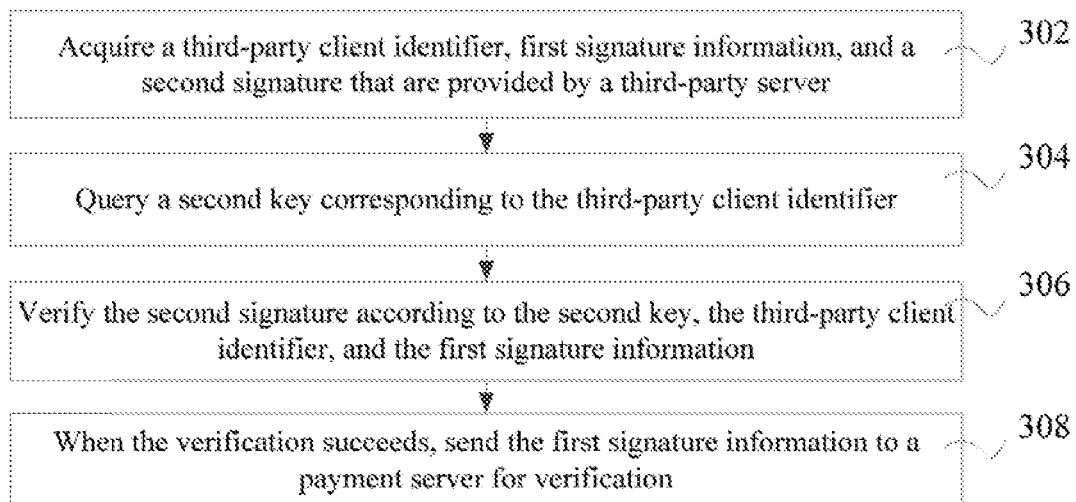
FIG. 3 is a flowchart of a signature verification method according to an embodiment of the present invention.

FIG. 3 is a flowchart of a signature verification method according to an embodiment of the present invention. This embodiment gives descriptions by using an example in which the signature verification method is applied in a client server shown in FIG. 1. The signature verification method includes:

Step 302: Acquire a third-party client identifier, first signature information, and a second signature that are provided by a third-party server.

The third-party client identifier is a unique identifier of a third party in the client server, the first signature information includes a third-party payment identifier, payment information, and a first signature, and the second signature is obtained by the third-party server by encrypting the third-party client identifier and the first signature information according to a second key.

Step 304: Query the second key corresponding to the third-party client identifier.

Step 306: Verify the second signature according to the second key, the third-party client identifier, and the first signature information.

Step 308: When the verification succeeds, send the first signature information to a payment server for verification.

The third-party payment identifier is a unique identifier of the third party in the payment server, the first signature is obtained by the third-party server by encrypting the third-party payment identifier and the payment information according to a first key, and the first key is a key corresponding to the third-party payment identifier in the payment server.

In conclusion, in the signature verification method provided in this embodiment, a third-party client identifier, first signature information, and a second signature that are provided by a third-party server are acquired; a second key corresponding to the third-party client identifier is queried; the second signature is verified according to the second key, the third-party client identifier, and the first signature information; and when the verification succeeds, the first signature information is sent to a payment server for verification, thereby solving a problem that both a third-party merchant and a payment service party have a key of the third-party merchant used in the foregoing transmission process, and once the key is leaked, other people can tamper with or forge order information by using the key, which easily causes property losses to a user or the third-party merchant and has low security, and achieving an effect of improving verification accuracy and improving security of payment information by verifying two signatures, where a third-party merchant keeps two keys and the client server and a payment server keep one key separately.

Figure 4:
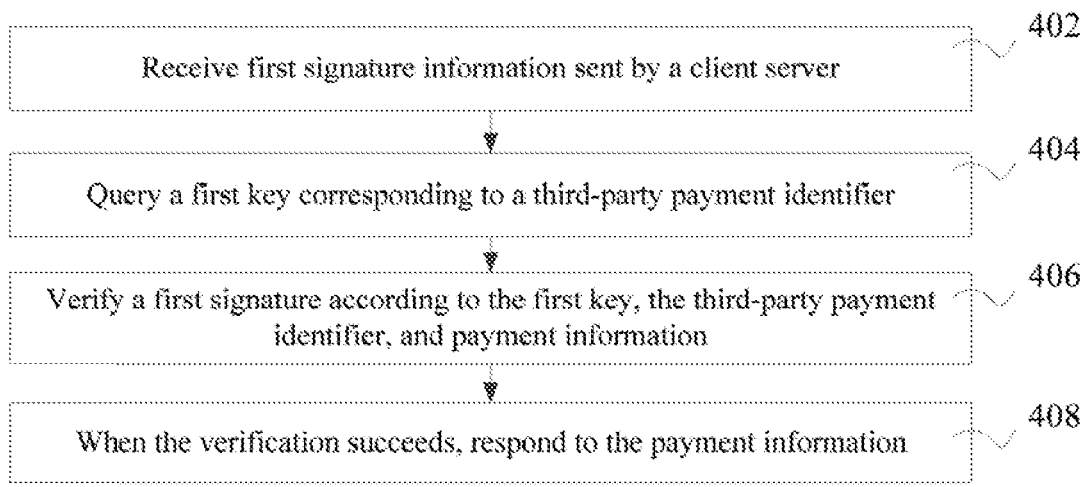
FIG. 4 is a flowchart of a signature verification method according to another embodiment of the present invention.

FIG. 4 is a flowchart of a signature verification method according to an embodiment of the present invention. This embodiment gives descriptions by using an example in which the signature verification method is applied in a payment server shown in FIG. 1. The signature verification method includes:

Step 402: Receive first signature information sent by a client server.

The first signature information includes a third-party payment identifier, payment information, and a first signature, the third-party payment identifier is a unique identifier of a third party in the payment server, and the first signature is obtained by a third-party server by encrypting the third-party payment identifier and the payment information according to a first key.

Step 404: Query the first key corresponding to the third-party payment identifier.

Step 406: Verify the first signature according to the first key, the third-party payment identifier, and the payment information.

Step 408: When the verification succeeds, respond to the payment information.

The first signature information is sent by the client server after the client server succeeds in verifying a second signature according to a second key, a third-party client identifier, and the first signature information, where the second signature is obtained by the third-party server by encrypting the third-party client identifier and the first signature information according to the second key, the second key is a key corresponding to the third-party client identifier in the client server, and the third-party client identifier is a unique identifier of the third party in the client server.

In conclusion, in the signature verification method provided in this embodiment, first signature information sent by a client server is received; a first key corresponding to a third-party payment identifier is queried; a first signature is verified according to the first key, a third-party payment identifier, and payment information; and when the verification succeeds, the payment information is responded to, thereby solving a problem that both a third-party merchant and a payment service party have a key of the third-party merchant used in the foregoing transmission, and once the key is leaked, other people can tamper with or forge order information by using the key, which easily causes property losses to a user or the third-party merchant and has low security, and achieving an effect of improving verification accuracy and improving security of payment information by verifying two signatures, where a third-party merchant keeps two keys and the client server and a payment server keep one key separately.

Figure 5A:
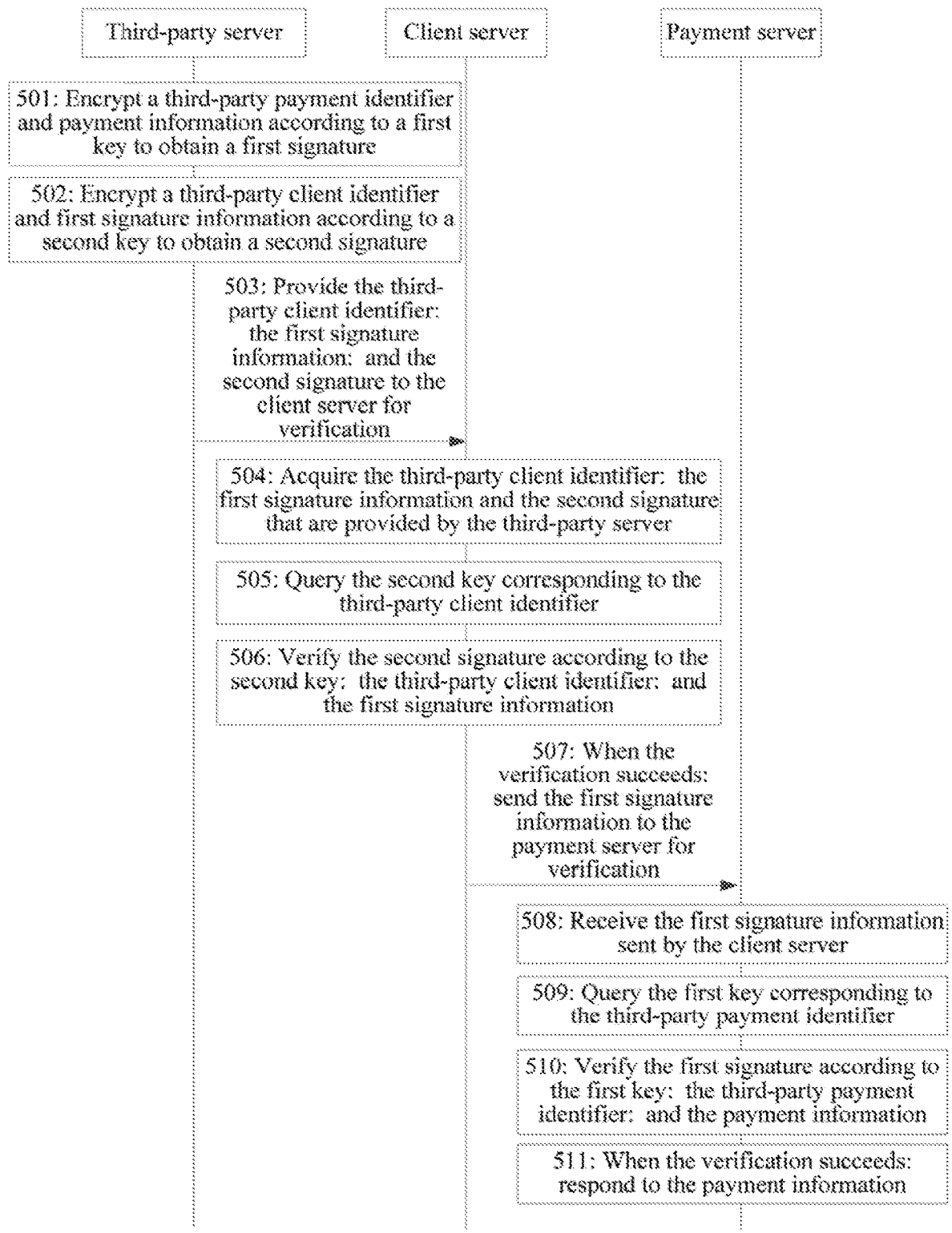
FIG. 5A is a flowchart of a signature verification method according to another embodiment of the present invention.

FIG. 5A is a flowchart of a signature verification method according to an embodiment of the present invention. This embodiment gives descriptions by using an example in which the signature verification method is applied in an implementation environment shown in FIG. 1. The signature verification method includes:

Step 501: A third-party server encrypts a third-party payment identifier and payment information according to a first key to obtain a first signature.

The first key is a key corresponding to the third-party payment identifier in a payment server, and the third-party payment identifier is a unique identifier of a third party in the payment server. The third-party payment identifier is registered in the payment server by a third-party merchant.

The first key may be automatically generated by the payment server and provided to the third-party server, and the first key corresponds to the third-party payment identifier. Each third-party payment identifier corresponds to a different first key. For example, if the third-party payment identifier is A, there is a first key A1 corresponding to A. Signature is a manner of encrypting transmitted payment information, and is used for ensuring that the transmitted payment information and other information are not tampered with.

This step specifically includes the following sub-steps:

1: The third-party server generates a first character string after the third-party payment identifier, the payment information, and the first key are arranged according to a first arrangement rule.

The first arrangement rule may be that: three fields, namely, the third-party payment identifier, the payment information, and the first key, are arranged according to an ascending order of ASCII code of the field names, or according to a descending order of ASCII code of the field names, or in another manner, which is not limited herein. The first character string is generated according to a predefined rule after the third-party payment identifier, the payment information, and the first key are arranged, where the predefined rule may be a format rule of a URL key-value pair.

For example, it is assumed that the third-party payment identifier is a=1, the payment information is b=2, and the first key is c=3, if the third-party payment identifier, the payment information, and the first key are arranged according to an ascending order of the ASCII code, a data string a=1 b=2 c=3 is obtained; then, a character string is generated from the data string according to the URL key-value pair, and a first character string a=1 & b=2& c=3 is generated from the data string a=1 b=2 c=3 according to a format of the URL key-value pair.

2: The third-party server encrypts the first character string in a first irreversible encryption manner to obtain the first signature.

The first irreversible encryption manner may be an encryption method, such as MD5 or Sha1. For example, the third-party server encrypts the first character string a=1 & b=2 & c=3 in the first irreversible encryption manner to obtain the first signature.

It should be noted supplementarily that, the fields may not be limited to the three fields, namely, the third-party payment identifier, the payment information, and the first key, and the third-party server usually further acquires at least one of two fields, namely, a first timestamp and a first random character string, where the first timestamp may correspond to a current moment when the first signature is generated, and the first random character string is used for ensuring uniqueness of the first character string. In this case, the third-party server may also generate the first character string after the acquired first timestamp and/or first random character string, the third-party payment identifier, the payment information, and the first key are arranged according to the first arrangement rule, and the third-party server adds the acquired first timestamp and/or first random character string in the first signature information.

Step 502: The third-party server encrypts a third-party client identifier and the first signature information according to a second key to obtain a second signature.

The first signature information includes the third-party payment identifier, the payment information, and the first signature. The first signature information may further include a first timestamp and/or a first random string. The second key is a key corresponding to the third-party client identifier in a client server, and the third-party client identifier is a unique identifier of the third-party merchant in the client server. The second key corresponds to the third-party client identifier, and different third-party client identifiers correspond to different second keys.

This step specifically includes the following sub-steps:

1: The third-party server generates a second character string after the third-party client identifier, the first signature information, and the second key are arranged according to a second arrangement rule.

In this step, a manner of generating the second character string by the third-party server is similar to a manner of generating the first character string by the third-party server in step 501, and no further details are provided herein.

2: The third-party server encrypts the second character string in a second irreversible encryption manner to obtain the second signature. The second irreversible encryption manner may be an encryption method, such as MD5 or Sha1.

It should be noted supplementarily that, the fields may not be limited to the three fields, namely, the third-party client identifier, the first signature information, and the second key, and the third-party server usually further acquires at least one of two fields, namely, a second timestamp and a second random character string, where the second timestamp may correspond to a current moment when the second signature is generated, and the second random character string is used for ensuring uniqueness of the second character string. In this case, the third-party server may also generate the second character string after the acquired second timestamp and/or second random character string, the third-party client identifier, the first signature information, and the second key are arranged according to the second arrangement rule.

Step 503: The third-party server provides the third-party client identifier, the first signature information, and the second signature to the client server for verification.

In addition, if the third-party server acquires at least one of the second timestamp and the second random character string, the third-party server provides the second timestamp and/or second random character string, the third-party client identifier, the first signature information, and the second signature to the client server for verification.

The first timestamp and the second timestamp are used for determining whether the payment information is within a period of validity.

It should be noted that, for a different payment manner, a manner of providing the third-party client identifier, the first signature information, and the second signature to the client server by the third-party server is different. In an implementation manner, the third-party server may send the third-party client identifier, the first signature information, and the second signature to the client server when a user triggers payment; in another implementation manner, the third-party server may convert the third-party client identifier, the first signature information, and the second signature into a two-dimensional code in advance, and embed the two-dimensional code in a webpage of goods, and when a user scans, by using a client, the two-dimensional code for payment, the client obtains the third-party client identifier, the first signature information, and the second signature by scanning the two-dimensional code, and sends the third-party client identifier, the first signature information, and the second signature to the client server, in still another implementation manner, the third-party server may pre-generate a payment link by using the third-party client identifier, the first signature information, and the second signature, and embed the payment link in a webpage of goods, and when a user clicks the payment link to invoke a client for payment, the client sends to the client server the third-party client identifier, the first signature information, and the second signature that are extracted from the payment link. In this specification, a manner of providing the third-party client identifier, the first signature information, and the second signature to the client server by the third-party server is specifically not limited.

Step 504: The client server acquires the third-party client identifier, the first signature information, and the second signature that are provided by the third-party server.

The third-party client identifier is a unique identifier of the third party in the client server, the first signature information includes the third-party payment identifier, the payment information, and the first signature, and the second signature is obtained by the third-party server by signing the third-party client identifier and the first signature information according to the second key.

The third-party payment identifier is the unique identifier of the third party in the payment server, the first signature is obtained by the third-party server by signing the third-party payment identifier and the payment information according to the first key, and the first key is a key corresponding to the third-party payment identifier in the payment server.

It should be noted supplementarily that, a manner of acquiring, by the client server, the third-party client identifier, the first signature information, and the second signature that are provided by the third-party server may be that: first, the client server directly receives the third-party client identifier, the first signature information, and the second signature that are sent by the third-party server; second, the client server receives the third-party client identifier, the first signature information, and the second signature that are obtained by scanning a two-dimensional code by a client, where the two-dimensional code is embedded in the webpage of goods after the third-party server generates the two-dimensional code by using the third-party client identifier, the first signature information, and the second signature in advance; third, the client server receives the third-party client identifier, the first signature information, and the second signature that are extracted from a triggered payment link by a client, where the payment link is embedded in the webpage of goods after the third-party server generates the payment link by using the third-party client identifier, the first signature information, and the second signature in advance. In this specification, a manner of acquiring, by the client server, the third-party client identifier, the first signature information, and the second signature that are provided by the third-party server is specifically not limited.

For example, when the client server knows that the client obtains, by scanning, goods purchase information represented by a two-dimensional code, the client server may directly invoke corresponding information from the third-party server, thereby improving an information processing speed.

Step 505: The client server queries the second key corresponding to the third-party client identifier.

After acquiring the third-party client identifier, the first signature information, and the second signature, the client server queries the second key corresponding to the third-party client identifier. The client server pre-stores the second key corresponding to the third-party client identifier. For example, if the third-party client identifier is B, there is a second key B1, corresponding to B, in the client server.

Step 506: The client server verifies the second signature according to the second key, the third-party client identifier, and the first signature information.

Figure 5B:
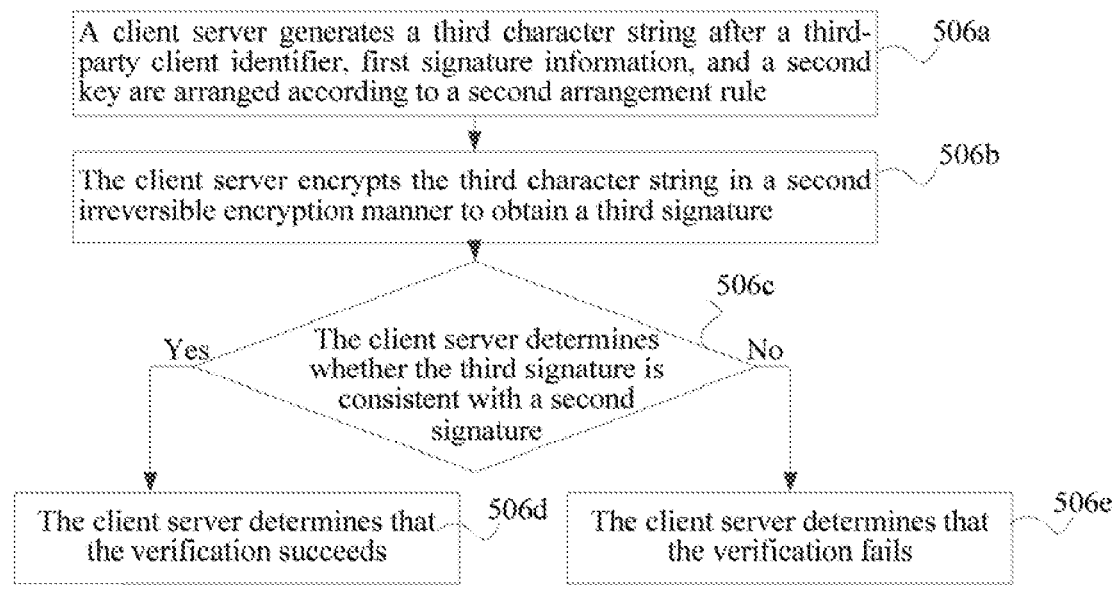
FIG. 5B is a flowchart of a signature verification method according to another embodiment of the present invention.

As shown in FIG. 5B, this step includes, but not limited to, the following sub-steps:

Step 506*a*: The client server generates a third character string after the third-party client identifier, the first signature information, and the second key are arranged according to the second arrangement rule.

In this step, a manner of generating the third character string by the client server is similar to a manner of generating the second character string by the third-party server in step 502, and no further details are provided herein. The arrangement rule in this step is the same as the arrangement rule in step 502, that is, if the third-party client identifier, the first signature information, and the second key are arranged according to an ascending order of the ASCII code of the field names in step 502, the same manner is used in this step.

Step 506*b*: The client server encrypts the third character string in a second irreversible encryption manner to obtain a third signature.

The second irreversible encryption manner may be an encryption method, such as MD5 or Sha1. It should be noted supplementarily that, the encryption manner in this step is the same as the encryption manner in step 502, that is, if the Sha1 encryption manner is used in step 502, the Sha1 encryption method is also used in this step.

Step 506*c*: The client server determines whether the third signature is consistent with the second signature.

Step 506*d*: If a determining result is that the third signature is consistent with the second signature, the client server determines that the verification succeeds.

For example, assuming that the second signature obtained by the third-party server by signing by using the second key B1 in step 502 is yyyy, and the third signature obtained by the client server by signing by using the second key B1 in this step is yyyy, the third signature is consistent with the second signature, which indicates that the information is not tampered with, and the client server determines that the verification succeeds.

Step 506*e*: If the determining result is that the third signature is inconsistent with the second signature, the client server determines that the verification fails.

For example, assuming that the second signature obtained by the third-party server by signing by using the second key B1 in step 502 is yyyy, and the third signature obtained by the client server by signing by using the second key B1 in this step is ffff, the third signature is inconsistent with the second signature, which indicates that the information is tampered with, and the client server determines that the verification fails.

Step 507: When the verification succeeds, the client server sends the first signature information to the payment server for verification.

It should be noted supplementarily that, if the client server receives the second timestamp that is sent by the third-party server at the same time, before step 505, the method further includes the following steps:

1: The client server receives the second timestamp that is sent by the third-party server and corresponds to the third-party client identifier, the first signature information, and the second signature.

2: The client server detects whether the second timestamp is within a predefined time range.

The timestamp is used for determining whether the payment information is within a period of validity, for example, if the second timestamp is within the predefined time range, the client server may continue to verify the second signature, that is, the client server performs the step of querying the second key corresponding to the third-party client identifier; and if the second timestamp exceeds the predefined time range, the client server does not continue to verify the second signature, that is, the client server does not perform the step of querying the second key corresponding to the third-party client identifier.

3: If a detection result is that the second timestamp is within the predefined time range, the client server performs the step of querying the second key corresponding to the third-party client identifier.

4: If the detection result is that the second timestamp is beyond the predefined time range, the client server does not perform the step of querying the second key corresponding to the third-party client identifier.

For example, assuming that the predefined time range is 60 seconds, if the second timestamp is within the 60 seconds, the client server performs the step of querying the second key corresponding to the third-party client identifier, and if the second timestamp is beyond the 60 seconds, the client server does not perform the step of querying the second key corresponding to the third-party client identifier.

Step 508: The payment server receives the first signature information sent by the client server.

The first signature information includes the third-party payment identifier, the payment information, and the first signature, the third-party payment identifier is the unique identifier of the third party in the payment server, and the first signature is obtained by a third-party server by signing the third-party payment identifier and the payment information according to the first key.

The first signature information is sent by the client server after the client server succeeds in verifying the second signature according to the second key, the third-party client identifier, and the first signature information, where the second signature is obtained by the third-party server by signing the third-party client identifier and the first signature information according to the second key, the second key is a key corresponding to the third-party client identifier in the client server, and the third-party client identifier is the unique identifier of the third party in the client server.

Step 509: The payment server queries the first key corresponding to the third-party payment identifier.

The payment server pre-stores the first key corresponding to the third-party payment identifier. For example, if the third-party payment identifier is A, there is a first key A1, corresponding to A, in the payment server.

Step 510: The payment server verifies the first signature according to the first key, the third-party payment identifier, and the payment information.

This step includes, but not limited to, the following sub-steps:

1: The payment server generates a fourth character string after the third-party payment identifier, the payment information, and the first key are arranged according to the first arrangement rule.

In this step, a manner of generating the fourth character string by the payment server is similar to a manner of generating the first character string by the third-party server in step 501, and no further details are provided herein. The arrangement rule in this step is the same as the arrangement rule in step 501, that is, if the third-party payment identifier, the payment information, and the first key are arranged according to an ascending order of the ASCII code of the field names in step 501, the same manner is used in this step.

2: The payment server encrypts the fourth character string in the first irreversible encryption manner to obtain a fourth signature.

The first irreversible encryption manner may be an encryption method, such as MD5 or Sha1. It should be noted supplementarily that, the encryption manner in this step is the same as the encryption manner in step 501, that is, if the MD5 encryption manner is used in step 501, the MD5 encryption method is also used in this step.

3: The payment server determines whether the fourth signature is consistent with the first signature.

4: If a determining result is that the fourth signature is consistent with the first signature, the client server determines that the verification succeeds.

For example, assuming that the second signature obtained by the third-party server by signing by using the first key A1 in step 501 is aaaa, and the fourth signature obtained by the payment server by signing by using the first key A1 in this step is aaaa, the fourth signature is consistent with the first signature, which indicates that the information is not tampered with, and the payment server determines that the verification succeeds.

5: If the determining result is that the fourth signature is inconsistent with the first signature, the payment server determines that the verification fails.

For example, assuming that the second signature obtained by the third-party server by signing by using the first key A1 in step 501 is aaaa, and the fourth signature obtained by the payment server by signing by using the first key A1 in this step is bbbb, the fourth signature is inconsistent with the first signature, which indicates that the information is tampered with, and the payment server determines that the verification fails.

Step 511: When the verification succeeds, the payment server responds to the payment information.

That is, the payment information is not tampered with, the next operation can be performed, and the payment server may respond to the payment information, such as ordering, transaction, or payment.

It should be noted supplementarily that, if the first signature information further includes the first timestamp, before step 509, the method further includes the following steps:

1: The payment server detects whether the first timestamp is within a predefined time range.

A manner of detecting, by the payment server, whether the first timestamp is within the predefined time range in this step is similar to a manner of detecting, by the client server, whether the second timestamp is within the predefined time range, and no further details are provided herein again. Principles of the following steps are similar to that of corresponding steps performed by the client server, and no further details are provided herein.

2: If a detection result is that the first timestamp is within the predefined time range, the payment server performs the step of querying the first key corresponding to the third-party payment identifier.

3: If the detection result is that the first timestamp is beyond the predefined time range, the payment server does not perform the step of querying the first key corresponding to the third-party payment identifier.

In conclusion, in the signature verification method provided in this embodiment, a third-party payment identifier and payment information are signed according to a first key to obtain a first signature; a third-party client identifier and first signature information are encrypted according to a second key to obtain a second signature; and the third-party client identifier, the first signature information, and the second signature are sent to a client server for verification, and when the client server succeeds in verifying the second signature according to the second key, the third-party client identifier, and the first signature information, the client server sends the first signature information to a payment server for verification, thereby solving a problem that both a third-party merchant and a payment service party have a key of the third-party merchant used in the foregoing transmission process, and once the key is leaked, other people can tamper with or forge order information by using the key, which easily causes property losses to a user or the third-party merchant and has low security, and achieving an effect of improving verification accuracy and improving security of payment information by verifying two signatures, where a third-party merchant keeps two keys and the client server and a payment server keep one key separately.

The following are apparatus embodiments of the present invention. For details not described in this part, reference may be made to corresponding method embodiments in the above.

Figure 6:
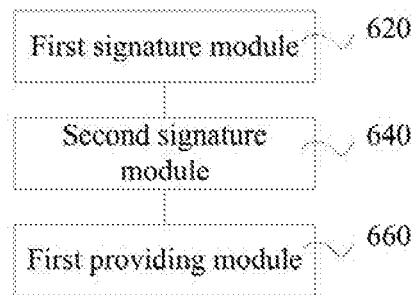
FIG. 6 is a schematic structural diagram of a signature verification apparatus according to an embodiment of the present invention.

FIG. 6 is a schematic structural diagram of a signature verification apparatus according to an embodiment of the present invention. The signature verification apparatus may be implemented as all or a part of a third-party server 600 by using software, hardware, or a combination of software and hardware. The signature verification apparatus includes: a first signature module 620, a second signature module 640, and a first sending module 660, where the first signature module 620 is configured to encrypt a third-party payment identifier and payment information according to a first key to obtain a first signature, where the first key is a key corresponding to the third-party payment identifier in a payment server, and the third-party payment identifier is a unique identifier of a third party in the payment server;

the second signature module 640 is configured to encrypt a third-party client identifier and first signature information according to a second key to obtain a second signature, where the first signature information includes the third-party payment identifier, the payment information, and the first signature that is obtained by the first signature module 620, the second key is a key corresponding to the third-party client identifier in a client server, and the third-party client identifier is a unique identifier of the third party in the client server; and the first sending module 660 is configured to send the third-party client identifier, the first signature information, and the second signature that is obtained by the second signature module 640 to the client server for verification, so that when the client server succeeds in verifying the second signature according to the second key, the third-party client identifier, and the first signature information, the client server sends the first signature information to the payment server for verification.

In conclusion, in the signature verification apparatus provided in this embodiment, a third-party payment identifier and payment information are encrypted according to a first key to obtain a first signature; a third-party client identifier and first signature information are encrypted according to a second key to obtain a second signature; and the third-party client identifier, the first signature information, and the second signature are sent to a client server for verification, thereby solving a problem that both a third-party merchant and a payment service party have a key of the third-party merchant used in the foregoing transmission process, and once the key is leaked, other people can tamper with or forge order information by using the key, which easily causes property losses to a user or the third-party merchant and has low security, and achieving an effect of improving verification accuracy and improving security of payment information by verifying two signatures, where a third-party merchant keeps two keys and the client server and a payment server keep one key separately.

Figure 7:
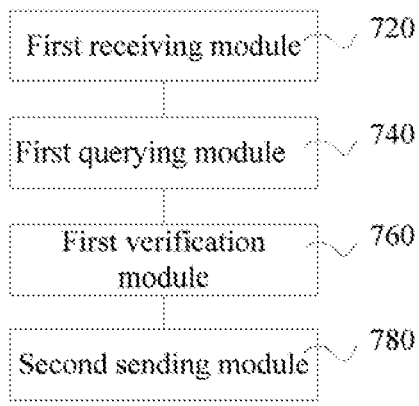
FIG. 7 is a schematic structural diagram of a signature verification apparatus according to an embodiment of the present invention.

FIG. 7 is a schematic structural diagram of a signature verification apparatus according to an embodiment of the present invention. The signature verification apparatus may be implemented as all or a part of a client server 700 by using software, hardware, or a combination of software and hardware. The signature verification apparatus includes: a first receiving module 720, a first querying module 740, a first verification module 760, and a second sending module 780, where the first receiving module 720 is configured to receive a third-party client identifier, first signature information, and a second signature that are sent by a third-party server, where the third-party client identifier is a unique identifier of a third party in the client server, the first signature information includes a third-party payment identifier, payment information, and a first signature, and the second signature is obtained by the third-party server by encrypting the third-party client identifier and the first signature information according to a second key;

the first querying module 740 is configured to query the second key corresponding to the third-party client identifier received by the first receiving module 720;

the first verification module 760 is configured to verify the second signature according to the second key queried by the first querying module 740, the third-party client identifier, and the first signature information; and the second sending module 780 is configured to: when the first verification module 760 succeeds in verifying the second signature, send the first signature information to a payment server for verification, where the third-party payment identifier is a unique identifier of the third party in the payment server, the first signature is obtained by the third-party server by encrypting the third-party payment identifier and the payment information according to a first key, and the first key is a key corresponding to the third-party payment identifier in the payment server.

In conclusion, in the signature verification apparatus provided in this embodiment, a third-party client identifier, first signature information, and a second signature that are sent by a third-party server are received; a second key corresponding to the third-party client identifier is queried; the second signature is verified according to the second key, the third-party client identifier, and the first signature information; and when the verification succeeds, the first signature information is sent to a payment server for verification, thereby solving a problem that both a third-party merchant and a payment service party have a key of the third-party merchant used in the foregoing transmission process, and once the key is leaked, other people can tamper with or forge order information by using the key, which easily causes property losses to a user or the third-party merchant and has low security, and achieving an effect of improving verification accuracy and improving security of payment information by verifying two signatures, where a third-party merchant keeps two keys and the client server and a payment server keep one key separately.

Figure 8:
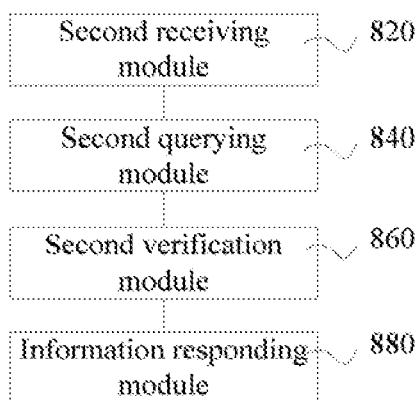
FIG. 8 is a schematic structural diagram of a signature verification apparatus according to another embodiment of the present invention.

FIG. 8 is a schematic structural diagram of a signature verification apparatus according to an embodiment of the present invention. The signature verification apparatus may be implemented as all or a part of a payment server 800 by using software, hardware, or a combination of software and hardware. The signature verification apparatus includes: a second receiving module 820, a second querying module 840, a second verification module 860, and an information responding module 880, where the second receiving module 820 is configured to receive first signature information sent by a client server, where the first signature information includes a third-party payment identifier, payment information, and a first signature, the third-party payment identifier is a unique identifier of a third party in the payment server, and the first signature is obtained by a third-party server by encrypting the third-party payment identifier and the payment information according to a first key;

the second querying module 840 is configured to query the first key corresponding to the third-party payment identifier received by the second receiving module 820;

the second verification module 860 is configured to verify the first signature according to the first key queried by the second querying module 840, the third-party payment identifier, and the payment information; and the information responding module 880 is configured to: when the second verification module 860 succeeds in verifying the first signature, respond to the payment information, where the first signature information is sent by the client server after the client server succeeds in verifying a second signature according to a second key, a third-party client identifier, and the first signature information, where the second signature is obtained by the third-party server by encrypting the third-party client identifier and the first signature information according to the second key, the second key is a key corresponding to the third-party client identifier in the client server, and the third-party client identifier is a unique identifier of the third party in the client server.

In conclusion, in the signature verification apparatus provided in this embodiment, first signature information sent by a client server is received; a first key corresponding to a third-party payment identifier is queried; a first signature is verified according to the first key, the third-party payment identifier, and payment information; and when the verification succeeds, the payment information is responded to, thereby solving a problem that both a third-party merchant and a payment service party have a key of the third-party merchant used in the foregoing transmission process, and once the key is leaked, other people can tamper with or forge order information by using the key, which easily causes property losses to a user or the third-party merchant and has low security, and achieving an effect of improving verification accuracy and improving security of payment information by verifying two signatures, where a third-party merchant keeps two keys and the client server and a payment server keep one key separately.

Figure 9:
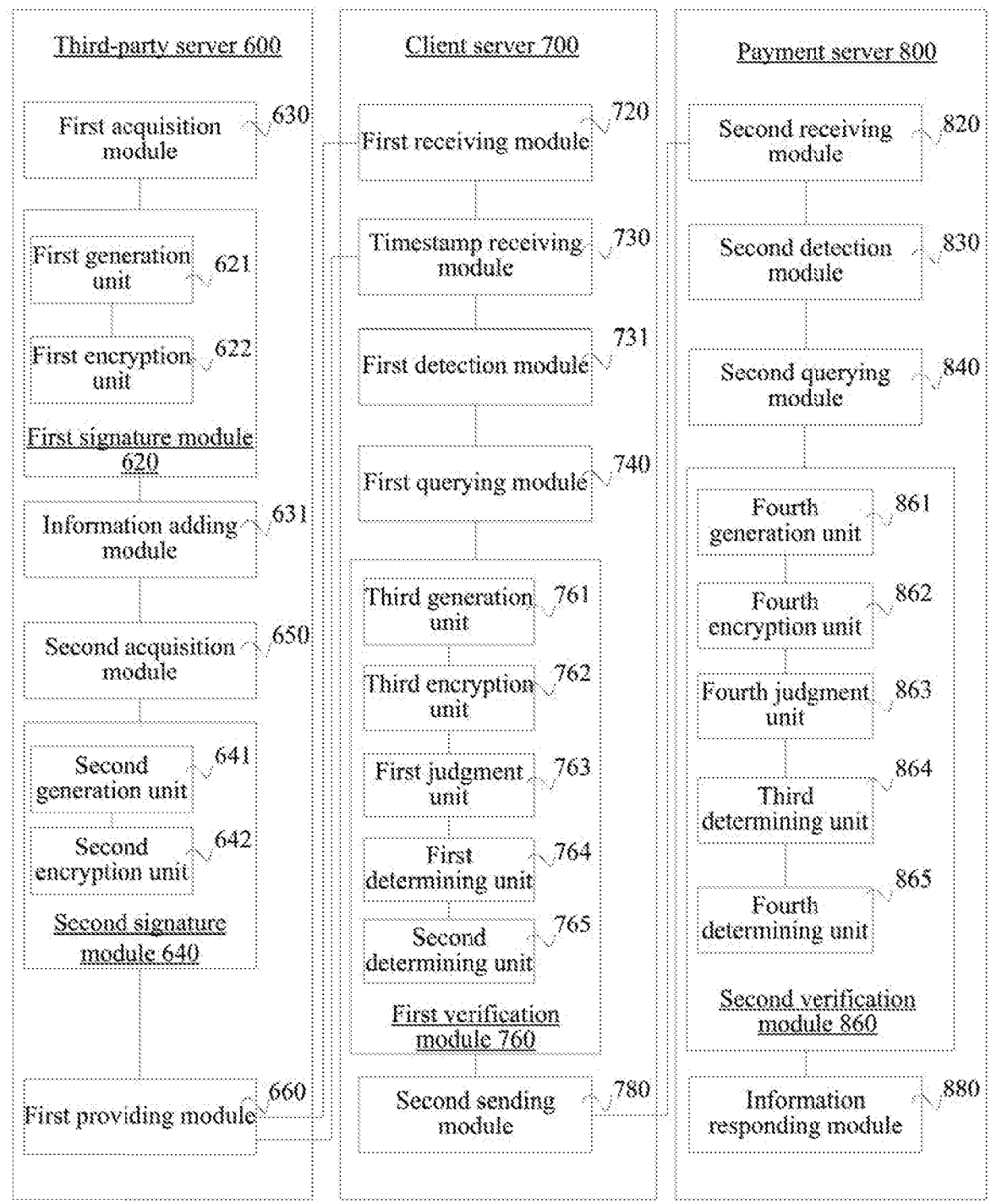
FIG. 9 is a schematic structural diagram of a signature verification system according to another embodiment of the present invention.

FIG. 9 is a schematic structural diagram of a signature verification system according to an embodiment of the present invention. The signature verification system includes a third-party server 600, a client server 700, and a payment server 800, where the third-party server 600 is connected to the client server 700 through a wireless network or a wired network, the client server 700 is connected to the payment server 800 through a wireless network or a wired network, and details are as follows:

The third-party server 600 includes a first signature module 620, a second signature module 640, and a first sending module 660, where the first signature module 620 is configured to encrypt a third-party payment identifier and payment information according to a first key to obtain a first signature, where the first key is a key corresponding to the third-party payment identifier in a payment server, and the third-party payment identifier is a unique identifier of a third party in the payment server;

the second signature module 640 is configured to encrypt a third-party client identifier and first signature information according to a second key to obtain a second signature, where the first signature information includes the third-party payment identifier, the payment information, and the first signature, the second key is a key corresponding to the third-party client identifier in the client server, and the third-party client identifier is a unique identifier of the third party in the client server; and the first sending module 660 is configured to send the third-party client identifier, the first signature information, and the second signature to the client server for verification, so that when the client server succeeds in verifying the second signature according to the second key, the third-party client identifier, and the first signature information, the client server sends the first signature information to the payment server for verification.

The first signature module 620 includes a first generation unit 621 and a first encryption unit 622, where the first generation unit 621 is configured to generate a first character string after the third-party payment identifier, the payment information, and the first key are arranged according to a first arrangement rule; and the first encryption unit 622 is configured to encrypt the first character string in a first irreversible encryption manner to obtain the first signature.

The second signature module 640 includes a second generation unit 641 and a second encryption unit 642, where the second generation unit 641 is configured to generate a second character string after the third-party client identifier, the first signature information, and the second key are arranged according to a second arrangement rule; and:

the second encryption unit 642 is configured to encrypt the second character string in a second irreversible encryption manner to obtain the second signature.

Further, the third-party server 600 further includes a first acquisition module 630, where the first acquisition module 630 is configured to acquire at least one of a first timestamp and a first random character string; and the first generation unit 621 is further configured to generate the first character string after the acquired first timestamp and/or first random character string, the third-party payment identifier, the payment information, and the first key are arranged according to the first arrangement rule.

Further, the third-party server 600 further includes an information adding module 631, where the information adding module 631 is configured to add the acquired first timestamp and/or first random character string in the first signature information.

Further, the third-party server 600 further includes:

a second acquisition module 650, configured to acquire at least one of a second timestamp and a second random character string, where the second generation unit 641 is further configured to generate the second character string after the acquired second timestamp and/or second random character string, the third-party client identifier, the first signature information, and the second key are arranged according to the second arrangement rule; and the first sending module 660 is further configured to send the second timestamp and/or second character string, the third-party client identifier, the first signature information, and the second signature to the client server for verification.

The client server 700 includes a first receiving module 720, a first querying module 740, a first verification module 760, and a second sending module 780, where the first receiving module 720 is configured to acquire a third-party client identifier, first signature information, and a second signature that are sent by a third-party server, where the third-party client identifier is a unique identifier of a third party in the client server, the first signature information includes a third-party payment identifier, payment information, and a first signature, and the second signature is obtained by the third-party server by encrypting the third-party client identifier and the first signature information according to a second key;

the first querying module 740 is configured to query the second key corresponding to the third-party client identifier;

the first verification module 760 is configured to verify the second signature according to the second key, the third-party client identifier, and the first signature information; and the second sending module 780 is configured to: when the verification succeeds, send the first signature information to a payment server for verification, where the third-party payment identifier is a unique identifier of the third party in the payment server, the first signature is obtained by the third-party server by encrypting the third-party payment identifier and the payment information according to a first key, and the first key is a key corresponding to the third-party payment identifier in the payment server.

Further, the first verification module 760 includes a third generation unit 761, a third encryption unit 762, a first judgment unit 763, a first determining unit 764, and a second determining unit 765, where the third generation unit 761 is configured to generate a third character string after the third-party client identifier, the first signature information, and the second key are arranged according to a second arrangement rule;

the third encryption unit 762 is configured to encrypt the third character string in a second irreversible encryption manner to obtain a third signature;

the first judgment unit is configured to determine whether the third signature is consistent with the second signature;

the first determining unit 764 is configured to: if a determining result is that the third signature is consistent with the second signature, determine that the verification succeeds; and the second determining unit 765 is configured to: if the determining result is that the third signature is inconsistent with the second signature, determine that the verification fails.

Further, the client server 700 further includes:

a timestamp receiving module 730, configured to receive a second timestamp that is sent by the third-party server and corresponds to the third-party client identifier, the first signature information, and the second signature; and a first detection module 731, configured to detect whether the second timestamp is within a predefined time range, where the first querying module 740 is configured to: if a detection result is that the second timestamp is within the predefined time range, perform the step of querying the second key corresponding to the third-party client identifier.

The payment server 800 includes a second receiving module 820, a second querying module 840, a second verification module 860, and an information responding module 880, where the second receiving module 820 is configured to receive first signature information sent by a client server, where the first signature information includes a third-party payment identifier, payment information, and a first signature, the third-party payment identifier is a unique identifier of a third party in the payment server, and the first signature is obtained by a third-party server by signing the third-party payment identifier and the payment information according to a first key;

the second querying module 840 is configured to query the first key corresponding to the third-party payment identifier;

the second verification module 860 is configured to verify the first signature according to the first key, the third-party payment identifier, and the payment information; and the information responding module 880 is configured to: when the verification succeeds, respond to the payment information, where the first signature information is sent by the client server after the client server succeeds in verifying a second signature according to a second key, a third-party client identifier, and the first signature information, where the second signature is obtained by the third-party server by encrypting the third-party client identifier and the first signature information according to the second key, the second key is a key corresponding to the third-party client identifier in the client server, and the third-party client identifier is a unique identifier of the third party in the client server.

Further, the second verification module 860 includes a fourth generation unit 861, a fourth encryption unit 862, a fourth judgment unit 863, a third determining unit 864, and a fourth determining unit 865, where the fourth generation unit 861 is configured to generate a fourth character string after the third-party payment identifier, the payment information, and the first key are arranged according to a first arrangement rule;

the fourth encryption unit 862 is configured to encrypt the fourth character string in a first irreversible encryption manner to obtain a fourth signature;

the fourth judgment unit 863 is configured to determine whether the fourth signature is consistent with the first signature;

the third determining unit 864 is configured to: if a determining result is that the fourth signature is consistent with the first signature, determine that the verification succeeds; and the fourth determining unit 865 is configured to: if the determining result is that the fourth signature is inconsistent with the first signature, determine that the verification fails.

Further, if the first signature information further includes a first timestamp, the payment server 800 includes:

a second detection module 830, configured to detect whether the first timestamp is within a predefined time range, where the second querying module 840 is configured to: if a detection result is that the first timestamp is within the predefined time range, perform the step of querying the first key corresponding to the third-party payment identifier.

In conclusion, in the signature verification apparatuses provided in this embodiment, a third-party payment identifier and payment information are signed according to a first key to obtain a first signature; a third-party client identifier and first signature information are signed according to a second key to obtain a second signature; and the third-party client identifier, the first signature information, and the second signature are sent to a client server for verification, and when the client server succeeds in verifying the second signature according to the second key, the third-party client identifier, and the first signature information, the client server sends the first signature information to a payment server for verification, thereby solving a problem that both a third-party merchant and a payment service party have a key of the third-party merchant used in the foregoing transmission process, and once the key is leaked, other people can tamper with or forge order information by using the key, which easily causes property losses to a user or the third-party merchant and has low security, and achieving an effect of improving verification accuracy and improving security of payment information by verifying two signatures, where a third-party merchant keeps two keys and the client server and a payment server keep one key separately.

Figure 10:
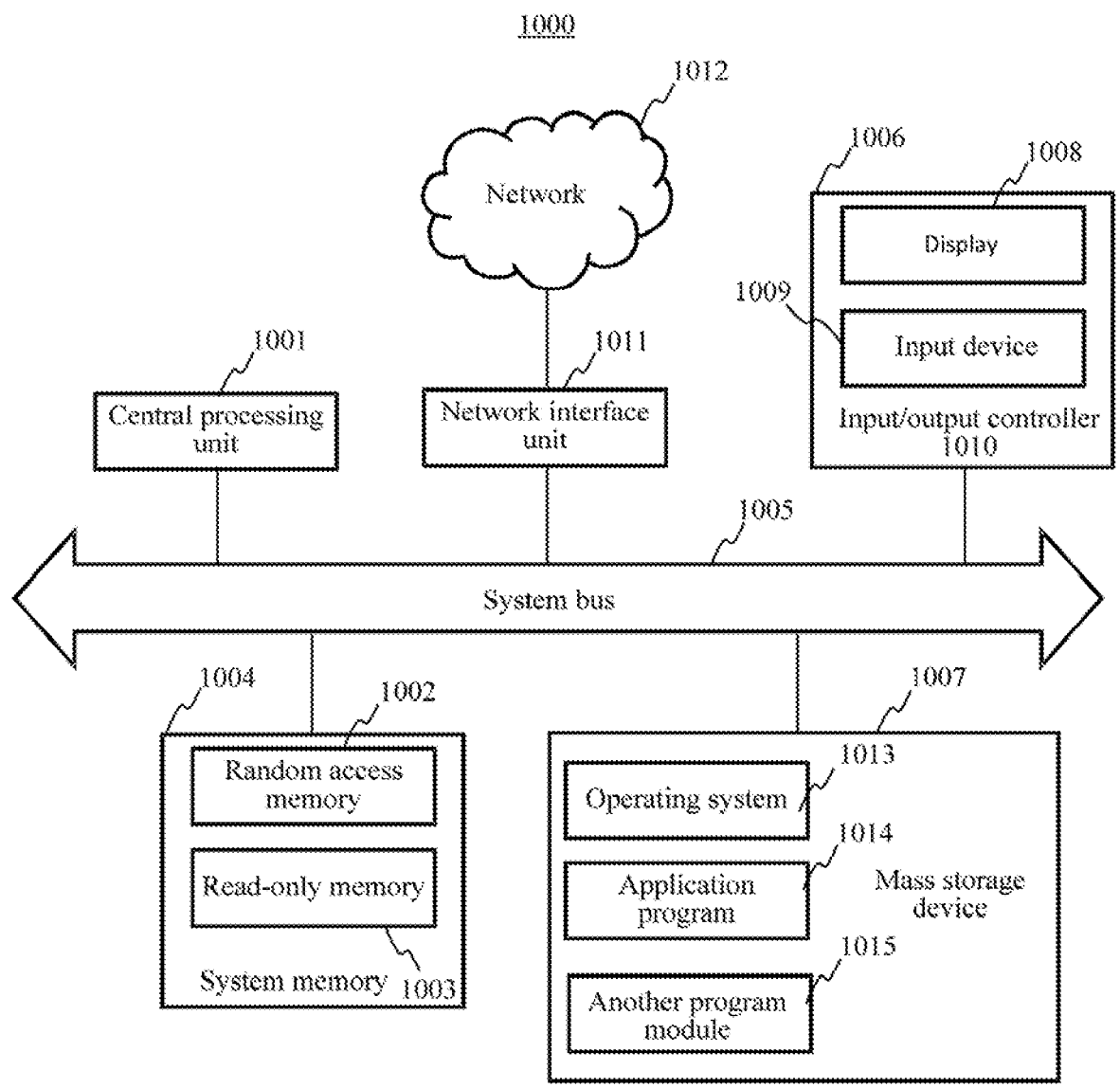
FIG. 10 is a schematic structural diagram of a server according to an embodiment of the present invention.

FIG. 10 is a schematic structural diagram of a server according to an embodiment of the present invention. The server may be a third-party server, or a client server, or a payment server. Specifically:

The server 1000 includes a central processing unit (CPU) 1001, a system memory 1004 including a random access memory (RAM) 1002 and a read-only memory (ROM) 1003, and a system bus 1005 connecting the system memory 1004 and the CPU 1001. The server 1000 further includes a basic input/output system (I/O system) 1006 helping information transmission between components in a computer, and a mass storage device 1007 configured to store an operating system 1013, an application program 1014, and another program module 1015.

The basic I/O system 1006 includes a display 1008 configured to display information and an input device 1009, such as a mouse or a keyboard, configured to input information by a user. The display 1008 and the input device 1009 are connected to the CPU 1001 by using an input/output controller 1010 connected to the system bus 1005. The basic I/O system 1006 may further include the input/output controller 1010, so as to receive and process input of multiple other devices such as the keyboard, the mouse, and an electronic stylus. Similarly, the input/output controller 1010 further provides output to a display screen, a printer, or an output device of another type.

The mass storage device 1007 is connected to the CPU 1001 by using a large scale storage controller (not shown in the figure) connected to the system bus 1005. The mass storage device 1007 and an associated computer readable medium provide non-volatile storage for a client device. That is, the mass storage device 1007 may include a computer readable medium (not shown in the figure) such as a hard disk or a CD-ROM drive.

Without loss of generality, the computer readable medium may include a computer storage medium and a communication medium. The computer storage medium includes volatile and non-volatile, movable and unmovable media implemented by using any method or technology and configured to store information such as a computer readable instruction, a data structure, a program module, or other data. The computer storage medium includes a RAM, a ROM, an EPROM, an EEPROM, a flash memory, or another solid storage technology, and a CD-ROM, a DVD, or another optical storage, and a cassette, a type, a disk storage, or another magnetic storage device. Certainly, a person skilled in the art may know that the computer storage medium is not limited to the foregoing. The system memory 1004 and the mass storage device 1007 may be uniformly called as a memory.

According to various embodiments of the present invention, the server 1000 may run by connecting to a remote computer on a network by using a network such as Internet. That is, the server 1000 may be connected to a network 1012 by using a network interface unit 1011 connected to the system bus 1005, or the server 1000 may be connected to a network of another type or a remote computer system (not shown in the figure) by using a network interface unit 1011.

The memory further includes one or more programs, the one or more programs are stored in the memory, and one or more CPUs 1001 are configured to execute the one or more programs including the signature verification method provided in any of the embodiments shown in FIG. 2 to FIG. 5B.

Figure 11:
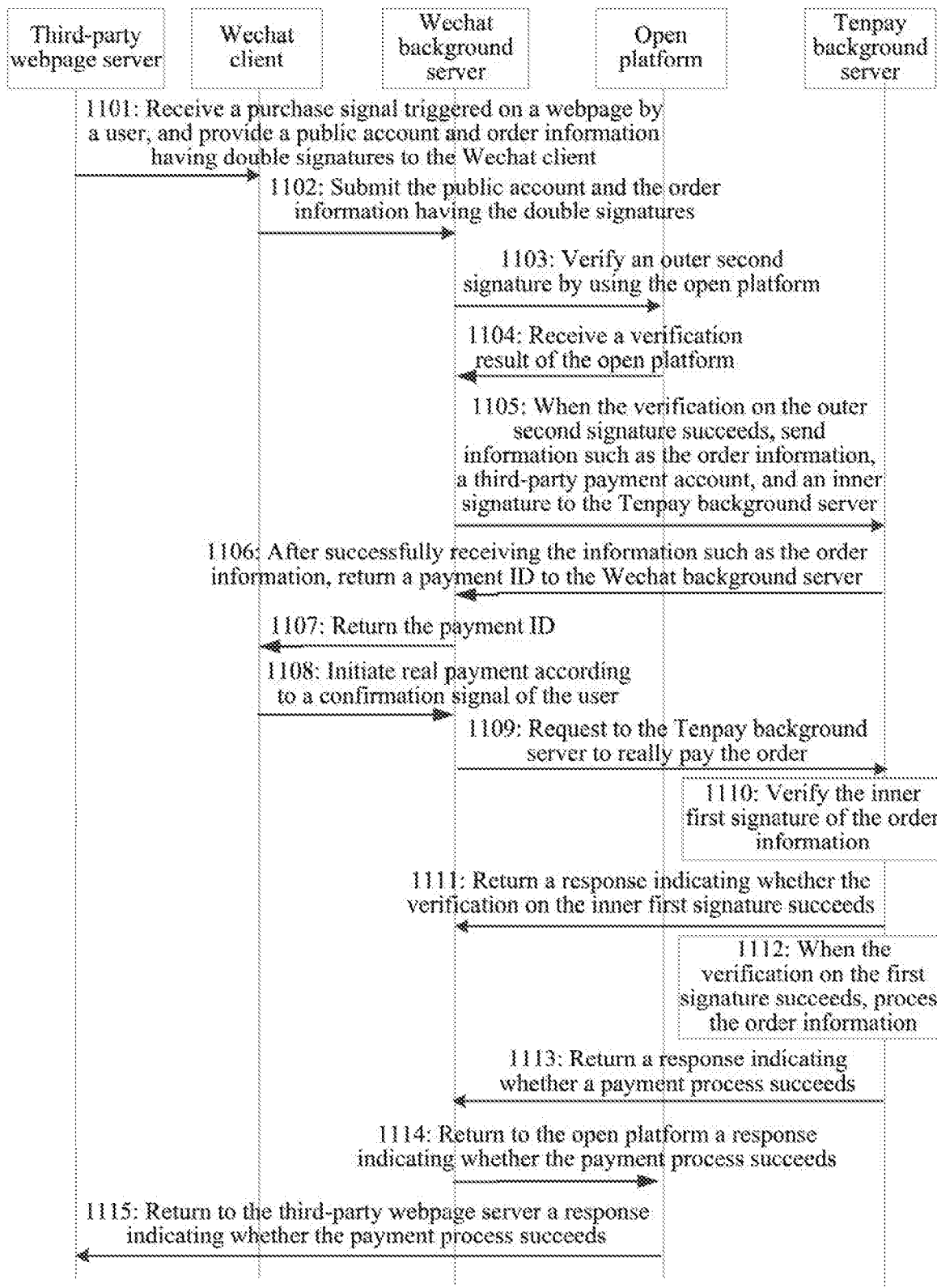
FIG. 11 is a schematic diagram of specific implementation of a signature verification method according to an embodiment of the present invention.

FIG. 11 is a schematic diagram of specific implementation of a signature verification method according to an embodiment of the present invention. In this embodiment, description is given by using an example in which a third-party server is a third-party webpage server provided by a merchant, a client server is a Wechat background server, and a payment server is a Tenpay background server. Wechat and Tenpay are Internet services provided by the Tencent technology (Shenzhen) Co., Ltd. in China. The signature verification method includes:

Step 1101: A third-party webpage server receives a purchase signal triggered on a webpage by a user, and provides a public account and order information that has double signatures to a Wechat client.

The third-party webpage server may provide a purchase webpage of goods. The user may view the purchase webpage on a browser of a mobile phone, and when determining to purchase the goods, click a purchase button on the purchase webpage to trigger the purchase signal. After receiving the purchase signal, the third-party webpage server may generate the order information having the double signatures, where the order information has an inner first signature and an outer second signature. The inner first signature is obtained by encryption according to a first key provided by the Tenpay, and the outer second signature is obtained by encryption according to a second key provided by the Wechat.

The third-party webpage server may invoke the Wechat client on the mobile phone of the user by using a predefined function interface, so as to initiate a payment process, and in the invoking process, provide the public account of the third-party merchant and the order information that has the double signatures in the Wechat to the Wechat client.

Step 1102: The Wechat client submits the public account and the order information that has the double signatures to the Wechat background server.

Step 1103: The Wechat background server verifies the outer second signature by using an open platform.

The open platform is a platform for the Wechat background server to provide an open service to the third-party merchant, where the open service includes a Wechat payment function. The open platform may be considered as a part of the Wechat background server.

After receiving the order information having the double signatures, the Wechat background server sends the order information, the public account of the third-party merchant in the Wechat, and the outer second signature to the open platform, and the open platform verifies the outer second signature. The open platform may query a corresponding key according to the public account of the third-party merchant in the Wechat.

Step 1104: The Wechat background server receives a verification result from the open platform.

When a verification result is that the verification succeeds, perform step 1105; and when the verification result is that the verification fails, feed back a response indicating that verification on the second signature fails to the Wechat client.

Step 1105: When the verification on the outer second signature succeeds, the Wechat background server sends information such as the order information, a third-party payment account, and the inner signature to the Tenpay background server.

The third-party payment account (partner ID) is an account of the third-party merchant in the Tenpay.

Step 1106: After successfully receiving the information such as the order information, the Tenpay background server returns a payment ID to the Wechat background server.

Step 1107: The Wechat background server returns the payment ID to the Wechat client.

After receiving the payment ID, the Wechat client may display a payment page about the payment ID to the user.

Step 1108: The Wechat client initiates real payment according to a confirmation signal of the user.

The Wechat client receives the confirmation signal of the user on the payment page, where in this process, the user may also need to input a Wechat payment passcode or perform another operation. After receiving the confirmation signal of the user, the Wechat client initiates real payment to the Wechat background server.

Step 1109: The Wechat background server requests to the Tenpay background server to really pay the order.

Step 1110: The Tenpay background server verifies the inner first signature of the order information.

The Tenpay background server may query a corresponding key according to the third-party payment account, and then verifies the first signature.

Step 1111: The Tenpay background server returns a response indicating whether verification on the inner first signature succeeds.

When the verification succeeds, the Tenpay background server returns to the Wechat background server a response indicating that the verification on the inner first signature succeeds, and performs step 1112.

When the verification fails, the Tenpay background server returns to the Wechat background server a response indicating that the verification on the inner first signature fails.

Step 1112: When verification on the first signature succeeds, the Tenpay background server processes the order information.

Step 1113: The Tenpay background server returns a response indicating whether the payment succeeds.

When the payment succeeds, the Tenpay background server returns to the Wechat background server a response indicating that the payment succeeds.

When the payment fails, the Tenpay background server returns to the Wechat background server a response indicating that the payment fails.

Step 1114: The Wechat background server returns to the open platform a response indicating whether the payment succeeds.

When the payment succeeds, the Wechat background server returns to the open platform a response indicating that the payment succeeds.

When the payment fails, the Wechat background server returns to the open platform a response indicating that the payment fails.

Step 1115: The open platform returns to the third-party webpage server a response indicating whether the payment succeeds.

When the payment succeeds, the open platform returns to the third-party webpage server a response indicating that the payment succeeds.

When the payment fails, the open platform returns to the third-party webpage server a response indicating that the payment fails.

In conclusion, in the signature generation apparatus provided in this embodiment, a Wechat background server verifies an outer second signature of order information, and a Tenpay background server verifies an inner first signature of the order information, thereby solving a problem that both a third-party merchant and a payment service party have a key of the third-party merchant used in the foregoing order information transmission process, and once the key is leaked, other people can tamper with or forge order information by using the key, which easily causes property losses to a user or the third-party merchant and has low security, and achieving an effect of improving verification accuracy and improving security of payment information by verifying two signatures, where the two keys are kept by the third-party merchant, and the Wechat background server and the Tenpay background server separately have one key.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely exemplary embodiments of the present invention, but are not intended to limit the present invention. Any modification, equivalent replacement, or improvement made within the spirit and principle of the present invention shall fall within the protection scope of the present invention.

What is claimed is:

1. A signature verification method, comprising:
  establishing, by a client server, a first connection between the client server and a third-party server via one of a wireless network connection or a wired network connection;
  establishing, by the client server, a second connection between the client server and a payment server, wherein the second connection is a different one of the wired network connection or the wireless network connection;
  receiving from the payment server, by the third-party server, a first key corresponding to a third-party payment identifier, the third-party payment identifier being a unique identifier of a third party in the payment server;
  generating a first signature, by the third-party server, by encrypting the third-party payment identifier and payment information according to the first key;
  receiving from the client server, by the third-party server, a second key corresponding to a third-party client identifier, the third-party client identifier being a unique identifier of the third party in the client server;

generating a second signature, by the third-party server, by encrypting the third-party client identifier and first signature information according to the second key, wherein the first signature information comprises the third-party payment identifier, the payment information, and the first signature;

sending, by the third-party server, the third-party client identifier, the first signature information, and the second signature to the client server;

receiving, by the client server, the third-party client identifier, the first signature information, and the second signature that are provided by the third-party server;

authenticating, by the client server, the second key corresponding to the third-party client identifier;

verifying, by the client server, the second signature according to the second key, the third party client identifier, and the first signature information; and in response to the verifying the second signature being successful, sending, by the client server, the first signature information to the payment server for verification;

receiving, by the payment server, the first signature information sent by the client server;

authenticating, by the payment server, the first key corresponding to the third-party payment identifier;

verifying, by the payment server, the first signature according to the first key, the third-party payment identifier, and the payment information; and in response to the verifying the first signature being successful, initiating, by the payment server, a transaction or a payment.

2. The method according to claim 1, wherein the generating the first signature, by the third-party server, by encrypting the third-party payment identifier and payment information according to the first key further comprises:

generating, by the third-party server, a first data string by arranging the third-party payment identifier, the payment information, and the first key according to a first arrangement rule; and generating, by the third-party server, a first character string based on the first data string, wherein the first signature is generated by encrypting the first character string in a first irreversible encryption manner.

3. The method according to claim 1, wherein the generating the second signature, by the third-party server, by encrypting the third-party client identifier and first signature information according to the second key further comprises:

generating, by the third-party server, a second data string by arranging the third-party client identifier, the first signature information, and the second key according to a second arrangement rule; and generating, by the third-party server, a second character string based on the second data string, wherein the second signature is generated by encrypting the second character string in a second irreversible encryption manner.

4. The method according to claim 2, wherein the method further comprises: before the generating the first data string by arranging the third-party payment identifier, the payment information, and the first key according to the first arrangement rule:

receiving, by the third-party server, at least one of a first timestamp and a first random character string, and wherein the generating the first data string by arranging the third-party payment identifier, the payment information, and the first key according to the first arrangement rule comprises:

generating, by the third-party server, the first data string by arranging the third-party payment identifier, the payment information, the first key and the at least one of the first timestamp and the first random character string according to the first arrangement rule.

5. The method according to claim 4, wherein after receiving the at least one of the first timestamp and the first random character string, the method further comprises:

adding the at least one of the first timestamp and the first random character string in the first signature information.

6. The method according to claim 3, further comprising: before the generating the second data string by arranging the third-party client identifier, the first signature information, and the second key according to the second arrangement rule, the method further comprises:

receiving, by the third-party server, at least one of a second timestamp and a second random character string, and wherein the generating the second data string by arranging the third-party client identifier, the first signature information, and the second key according to the second arrangement rule comprises:

generating, by the third-party server, the second data string by arranging the third-party client identifier, the first signature information, the second key and the at least one of the second timestamp and the second random character string according to the second arrangement rule.

7. The method according to claim 6, wherein the sending, by the third-party server, the third-party client identifier, the first signature information, and the second signature to the client server for verification comprises:

sending, by the third-party server, the third-party client identifier, the first signature information, the second signature, and the at least one of the second timestamp and the second random character string to the client server for verification.

8. A signature verification system, comprising a third-party server; a client server; and a payment server, the third-party server comprises a third-party server memory storing third-party server instructions that are executed by a third-party server processor coupled to the third-party server memory, causing the third-party server processor to perform operations comprising:

receiving, from the payment server, a first key corresponding to a third-party payment identifier in the payment server, the third-party payment identifier being a unique identifier of a third party in the payment server;

generating a first signature by encrypting the third-party payment identifier and payment information according to the first key;

receiving, from a client server, a second key corresponding to a third-party client identifier in the client server, the third-party client identifier being a unique identifier of the third-party in the client server;

generating a second signature by encrypting the third-party client identifier and first signature information according to the second key, wherein the first signature information comprises the third-party payment identifier, the payment information, and the first signature; and sending the third-party client identifier, the first signature information, and the second signature to the client server, the client server comprises a client server memory storing client server instructions executed by a client server processor coupled to the client server memory, causing the client server processor to perform operations comprising:

establishing a first connection between the client server and the third-party server via one of a wireless network connection or a wired network connection;

establishing a second connection between the client server and the payment server, wherein the second connection is a different one of the wired network connection or the wireless network connection;

acquiring the third-party client identifier, first signature information, and the second signature provided by the third-party server;

querying the second key corresponding to the third-party client identifier;

conducting a client server verification verifying the second signature according to the second key, the third-party client identifier, and the first signature information; and in response to determining that the client server verification succeeds, sending the first signature information to the payment server, the payment server comprises a payment server memory storing payment server instructions executed by a payment server processor coupled to the payment server memory, causing the payment server processor to perform operations comprising:

receiving the first signature information sent by the client server;

verifying the first key corresponding to the third-party payment identifier;

verifying the first signature according to the first key, the third-party payment identifier, and the payment information; and in response to determining that the payment server verification succeeds, initiating a transaction or payment.

9. The system according to claim 8, wherein the third-party server processor is further configured to perform operations comprising:

generating a first data string by arranging the third-party payment identifier, the payment information, and the first key according to a first arrangement rule; and generating a first character string based on the first data string, wherein the first signature is generated by encrypting the first character string in a first irreversible encryption manner.

10. The system according to claim 8, wherein the third-party server processor is further configured to perform operations comprising:

generating a second character string by arranging the third-party client identifier, the first signature information, and the second key according to a second arrangement rule; and generating a second character string based on the second data string wherein the second signature is generated by encrypting the second character string in a second irreversible encryption manner.

11. The system according to claim 9, wherein before generating the first data string by arranging the third-party payment identifier, the payment information, and the first key according to the first arrangement rule, the third-party server processor is further configured to perform operations comprising:

receiving at least one of a first timestamp and a first random character string, wherein the third-party server processor is further configured to perform operations comprising: generating the first data string by arranging the third-party payment identifier, the payment information, the first key and the at least one of the first timestamp and the first random character string according to the first arrangement rule.

12. The system according to claim 11, wherein the third-party server processor is further configured to perform operations comprising:

adding the at least one of the first timestamp and the first random character string in the first signature information.

13. The system according to claim 10, wherein before generating the second data string by arranging the third-party client identifier, the first signature information, and the second key according to the second arrangement rule, the third-party server processor is further configured to perform operations comprising:

receiving at least one of a second timestamp and a second random character string, wherein the second data string is generated by arranging the third-party client identifier, the first signature information, the second key and the at least one of the second timestamp and the second random character string according to the second arrangement rule.

14. The system according to claim 13, wherein third-party server processor is further configured to perform operations comprising:

sending the third-party client identifier, the first signature information, the second signature, and the at least one of the second timestamp and the second random character string to the client server for the client server verification.

* * * * *